United States Patent
Zhang et al.

(10) Patent No.: US 9,234,565 B2
(45) Date of Patent: Jan. 12, 2016

(54) TWO-SPEED TRANSMISSION AND ELECTRIC VEHICLE

(75) Inventors: MingLiang Zhang, Shanghai (CN); Futang Zhu, Shanghai (CN); Jie Shu, Shanghai (CN); Chengliang Yin, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/404,345

(22) PCT Filed: May 31, 2012

(86) PCT No.: PCT/CN2012/076355
§ 371 (c)(1),
(2), (4) Date: Nov. 26, 2014

(87) PCT Pub. No.: WO2013/177783
PCT Pub. Date: Dec. 5, 2013

(65) Prior Publication Data
US 2015/0141191 A1    May 21, 2015

(51) Int. Cl.
*H02P 15/00* (2006.01)
*F16H 3/00* (2006.01)
*F16H 3/54* (2006.01)
*F16H 3/44* (2006.01)
(Continued)

(52) U.S. Cl.
CPC ............. *F16H 3/006* (2013.01); *F16H 3/44* (2013.01); *F16H 3/54* (2013.01); *B60K 6/54* (2013.01); *B60K 2001/001* (2013.01); *F16H 2003/445* (2013.01); *F16H 2200/0021* (2013.01); *F16H 2200/0034* (2013.01); *F16H 2200/2005* (2013.01)

(58) Field of Classification Search
CPC ............... B60W 30/18018; B60W 10/192; B60W 10/04; B60W 2510/184; B60W 2300/45; F02N 11/0833; F02N 2200/102; F02N 2200/08
USPC ................................. 477/8, 3, 5, 150; 475/5
See application file for complete search history.

(56) References Cited

U.S. PATENT DOCUMENTS 6,513,401 B2    2/2003    Bologna
8,834,314 B2 *  9/2014    Bergquist ................ 475/312
(Continued)

FOREIGN PATENT DOCUMENTS

CN    2875938        3/2007
WO    2009121188     10/2009

OTHER PUBLICATIONS

International Search Report for Application No. PCT/CN2012/076355 dated Mar. 7, 2013 (4 pages).

*Primary Examiner* — David J Hlavka
(74) *Attorney, Agent, or Firm* — Michael Best & Friedrich LLP

(57) ABSTRACT

A two-speed transmission is provided. The transmission comprises a planetary gear train (8) having a sun gear, a fixed annular gear (8b), at least one planet gear (8c) and a planet carrier (8d). A dual clutch (10) is disposed between the planetary gear train and a prime mover which outputs rotational movement. The dual clutch is configured to be driven into a first clutching mode in which it kinematically couples the sun gear with the prime mover, and a second clutching mode in which it kinematically couples the planet carrier with the prime mover. And an actuator is configured to selectively drive the dual clutch into one of its first and second clutching modes. An electric vehicle comprises the two-speed transmission.

14 Claims, 1 Drawing Sheet

(51) Int. Cl.
*B60K 6/54* (2007.10)
*B60K 1/00* (2006.01)

(56) References Cited

U.S. PATENT DOCUMENTS

| | | | |
|---|---|---|---|
| 8,915,816 B2* | 12/2014 | Bergquist et al. | 475/5 |
| 2007/0105678 A1 | 5/2007 | Bucknor et al. | |
| 2010/0125020 A1* | 5/2010 | Ikegami et al. | 477/3 |
| 2010/0173746 A1* | 7/2010 | Ideshio et al. | 477/36 |
| 2011/0143874 A1 | 6/2011 | Tangl | |
| 2012/0021861 A1* | 1/2012 | Sakai et al. | 475/5 |
| 2012/0028747 A1 | 2/2012 | Imamura et al. | |
| 2012/0053011 A1* | 3/2012 | Onomura et al. | 477/3 |
| 2012/0115674 A1* | 5/2012 | Ikegami | 477/3 |
| 2012/0115677 A1 | 5/2012 | Sakai et al. | |
| 2013/0331227 A1* | 12/2013 | Kato | 477/3 |

* cited by examiner

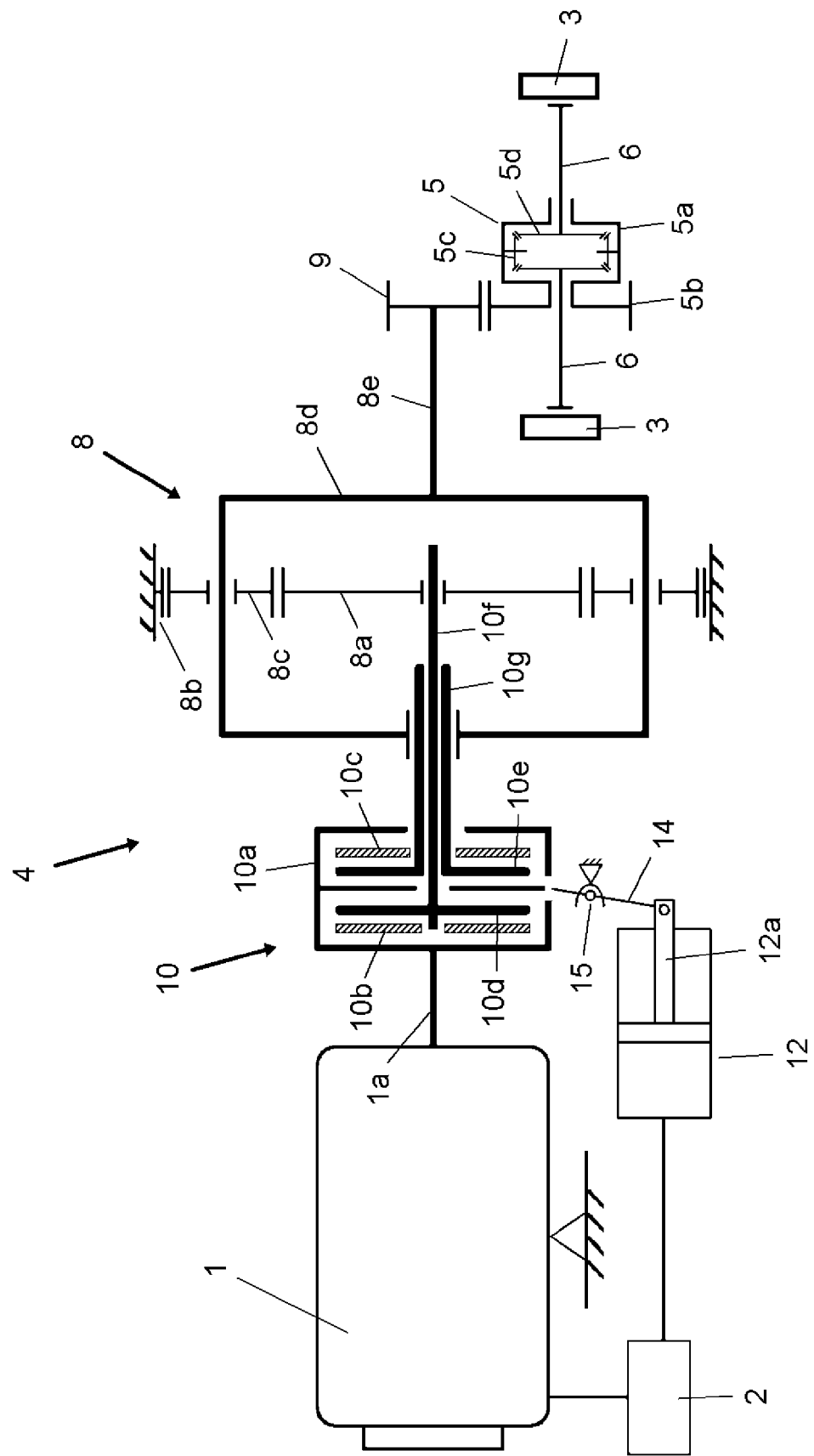

TWO-SPEED TRANSMISSION AND ELECTRIC VEHICLE

BACKGROUND OF THE INVENTION

The present invention relates to an improved two-speed transmission, in particular for an electric vehicle, which provides two speed ratios with a simple configuration. The present invention also relates to an electric vehicle comprising such a two-speed transmission.

Electric vehicles generally use at least one electric motor for propulsion. Output rotation and torque of the electric motor are transmitted to the wheels of the vehicle via a transmission.

For example, U.S. Pat. No. 6,513,401B2 discloses a transmission unit for axles of vehicles with electric drive, the transmission unit comprising a drive gear, a driven gear, and an intermediate idler gear meshing with both the drive gear and the driven gear. The speed ratio of the transmission unit can be varied by replacing the drive gear and the driven gear and displacing the axis of rotation of the idler gear. However, once the drive gear and the driven gear are set, the transmission unit can provide only a fixed speed ratio.

It is known that an electric motor has a desired speed range in which the electric motor operates in a high efficiency region. The operation efficiency of the electric motor decreases when the speed of the electric motor falls out of this desired speed range. For an electric vehicle having a transmission with a single or fixed speed ratio, as that disclosed in U.S. Pat. No. 6,513,401B2, the electric motor has to operate at a low speed with a low efficiency in some conditions, especially when the running speed of the vehicle is low.

In order to increase the operation efficiency of the electric motor by operating it in the high efficiency region, a transmission which provides more than one speed ratio could be adopted. As an example, CN2875938Y discloses a two-speed automatic transmission for electric vehicles, the transmission comprising two gear pairs for providing different speed ratios, an output shaft which is able to be selectively coupled with either of the two gear pairs, and a splined hub fixed to the output shaft and configured to be displaced by means of a lever. When the vehicle runs at a low speed, the transmission is switched automatically to provide a higher speed ratio so that the electric motor operates at a higher speed, which results in higher efficiency of the electric motor.

However, a transmission with more than one speed ratio generally has a complex configuration. For example, two gear pairs are used in the automatic transmission disclosed in CN2875938Y. Such a transmission may be expensive or have a large size.

It is thus highly desirable to have a transmission which can provide more than one speed ratio with a simple configuration.

SUMMARY OF THE INVENTION

In view of the problems existed in the prior art, an object of the invention is to provide an improved transmission for an electric vehicle which can provide more than one speed ratio in a simple and easy way.

For achieving this object, the present invention in one aspect provides a two-speed transmission, in particular for an electric vehicle, comprising a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear; a dual clutch disposed between the planetary gear train and a prime mover which outputs a rotational movement, the dual clutch being configured to be driven into a first clutching mode in which it kinematically couples the sun gear with the prime mover, and a second clutching mode in which it kinematically couples the planet carrier with the prime mover; and an actuator configured for selectively driving the dual clutch into one of its first and second clutching modes.

In accordance with a preferred embodiment of the invention, the output shaft of the prime mover is coaxial with an output gear connected to the planet carrier.

In accordance with a preferred embodiment of the invention, the transmission provides a first speed ratio when the dual clutch is in the first clutching mode and a second speed ratio when the dual clutch is in the second clutching mode, the second speed ratio being equal to 1, and the first speed ratio being larger than 1.

In accordance with a preferred embodiment of the invention, the dual clutch comprises an input element for receiving the rotational movement from the prime mover, a first output shaft around which the sun gear is mounted, a second output shaft around which the planet carrier is mounted, a first clutching assembly which, in an engaged state when the dual clutch is in the first clutching mode, couples the input element with the first output shaft, and a second clutching assembly which, in an engaged state when the dual clutch is in the second clutching mode, couples the input element with the second output shaft.

In accordance with a preferred embodiment of the invention, the actuator is coupled with the first and second clutching assemblies for selectively driving one of them into its engaged state, while keeping the other one of them in a disengaged state.

In accordance with a preferred embodiment of the invention, each of the first and second clutching assemblies comprises a movable clutching element which is axially displaceable, and a stationary clutching element opposing to the movable clutching element.

In accordance with a preferred embodiment of the invention, the input element comprises a clutch housing which is able to be displaced axially by the actuator, the movable clutching element comprising a pressure plate fixed to the interior of the clutch housing, and the stationary clutching element comprising a clutch plate; wherein the clutch plate of the first clutch assembly is carried by the first output shaft, and the clutch plate of the second clutch assembly is carried by the second output shaft; and wherein the clutch plates of the first and second clutching assemblies are disposed between the pressure plates of the first and second clutching assemblies.

In accordance with a preferred embodiment of the invention, the two-speed further comprises a lever connected between the actuator and the dual clutch so that the actuator drives the first and second clutching assemblies via the lever.

In accordance with a preferred embodiment of the invention, the second output shaft extends around the first output shaft, and the first and second shafts are coupled with each other by coaxial spline coupling.

In accordance with a preferred embodiment of the invention, the actuator comprises an electric, electromagnetic, pneumatic or hydraulic type linear or rotary actuator.

The present invention in another aspect provides an electric vehicle comprising an electric motor as a prime mover; a two-speed transmission described above, the planet carrier of the planetary gear train of the transmission being coupled with at least one wheel of the vehicle; and a controller connected with the electric motor and the actuator of the transmission for controlling the operations of the electric motor and the actuator.

In accordance with a preferred embodiment of the invention, the at least one wheel comprises a pair of wheels, and the transmission is coupled with the pair of wheels via a differential.

In accordance with a preferred embodiment of the invention, the electric motor and the transmission are integrated into a single housing.

The invention provides a high-efficiency vehicle transmission that achieves two speed ratios so as to allow optimal extraction of motor performance in both low and high vehicle speed regions.

Further, the transmission of the invention has a simple and compact structure, which is advantageous for lowering down the cost of the transmission.

Furthermore, by means of the transmission of the invention, the change in vehicle speed at the time of gear shifting is reduced, and thus good driving feeling can be obtained.

BRIEF DESCRIPTION OF THE DRAWINGS

The invention will be further understood by reading the following detailed description with reference to the drawings in which:

FIG. 1 is a schematic diagram of a power train of an electric vehicle according to a preferred embodiment of the invention.

DETAILED DESCRIPTION

First, it is noted that the transmission of the invention is proposed in view of a fact that an electric motor itself has a wide speed range. In some conditions, two-speed transmissions may be good enough for electric vehicles, especially low price vehicles, if most of concerned objectives can be achieved. Thus, the invention is aimed at a two-speed transmission for an electric vehicle.

A main function of the transmission according to the invention is to enable the electric motor to be able to operate in its high efficiency region. A two-speed transmission having this as well as other functions will be described now with reference to the drawings.

FIG. 1 shows schematically a power train of an electric vehicle according to a preferred embodiment of the invention. The illustrated power train comprises an electric motor 1 which acts as an electro-mechanical energy converter for converting electricity to mechanical power. During normal driving of the electric vehicle, the electric motor 1 is energized by electricity from an on-board battery pack and outputs rotational movement and torque. Optionally, the electric motor 1 may additionally act as an electric generator during brake operation of the electric vehicle for converting braking force into electricity which may be fed back to the battery pack.

The operation of the electric motor 1 is controlled by a controller 2 connected therewith. The controller 2 may be the vehicle ECU (electronic control unit), a sub-module in the vehicle ECU, an individual controller communicated with the vehicle ECU or the like. The controller 2 receives commands from the driver, including information about operations to the gearshift, the acceleration pedal and other pedals as well as other related information, and then controls the electric motor 1 to rotate in a desired direction at a desired speed. The speed of the electric motor 1 depends on various factors, such as the intensity of the electric current supplied from the battery pack, driving resistance of the vehicle, etc.

A pair of wheels 3 are driven by the electric motor 1 via a two-speed transmission 4. A differential 5 is disposed between the transmission 4 and the pair of wheels 3. In the illustrated embodiment, the differential 5 is an integrated bevel gear differential comprising a differential case $5a$, and an external input gear $5b$, a pair of opposed internal intermediate bevel gears $5c$ and a pair of opposed internal output bevel gears $5d$, all carried by the differential case $5a$. The pair of intermediate bevel gears $5c$ have central axes co-linear with each other and perpendicular to the central axis of the external input gear $5b$, and the pair of output bevel gears $5d$ have central axes co-linear with each other and coaxial with the central axis of the external input gear $5b$ and are each meshed between both the intermediate bevel gears $5c$. Each output bevel gear $5d$ is connected with a driving axle 6 of a corresponding wheel 3.

When the external input gear $5b$ is rotated, its rotational movement is transmitted simultaneously to the pair of wheels 3 via the differential case $5a$, the intermediate bevel gears $5c$ and the output bevel gears $5d$. The output bevel gears $5d$ are able to rotate with respect to the differential case $5a$ in opposite directions, which allows the two wheels 3 to rotate at different speeds.

It is appreciated that the pair of wheels 3 form a pair of driving wheels of the electric vehicle. The electric vehicle may have a pair of front driving wheels, a pair of back driving wheels, or two pairs of front and back driving wheels.

It is also appreciated that, in the illustrated embodiment, a pair of driving wheels are driven by a common electric motor 1 via a common transmission 4; however, in an alternative embodiment, each of a pair of driving wheels is driven by an individual electric motor 1 via an individual transmission 4. In this case, the differential 5 is omitted.

The transmission 4 comprises a planetary gear train 8. The planetary gear train 8 mainly comprises a sun gear $8a$ which is rotatable round a central axis, a fixed annular gear or gear ring $8b$ disposed coaxially around the sun gear $8a$, at least one planet gear $8c$ meshing between the sun gear $8a$ and the annular gear $8b$, and a planet carrier $8d$ which carries the at least one planet gear $8c$ and is rotatable round the same central axis with the sun gear $8a$. The entire planetary gear train 8 is also referred to as sun-planet-annulus train. Note that generally more than one planet gear $8c$ is provided between the sun gear $8a$ and the annular gear $8b$ primarily for sharing load and giving better balance.

The output shaft $1a$ of the electric motor 1 is coaxial with the sun gear $8a$.

An output gear 9 is carried by the planet carrier $8d$ via a rotary shaft $8e$ which is connected to the planet carrier $8d$, and meshes with the external input gear $5b$ of the differential 5. The rotary shaft $8e$ is coaxial with the sun gear $8a$.

The planet carrier $8d$ acts as an output member of the planetary gear train 8. When the sun gear $8a$ is used as an input member of the planetary gear train 8, the speed ratio (gear ratio) between the sun gear $8a$ and the planet carrier $8d$ can be found using the fundamental equation for epicyclic trains at every point where two gears mesh; thus we can write $$(\omega 8a - \omega 8d)/(\omega 8b - \omega 8d) = -Z8b/Z8a$$

where $\omega 8a$, $\omega 8b$ and $\omega 8d$ are rotational velocities of the sun gear $8a$, the annular gear $8b$ and the planet carrier $8d$ respectively, and $Z8a$ and $Z8b$ are numbers of teeth of the sun gear $8a$ and the annular gear $8b$.

Since the annular gear $8b$ is fixed, $\omega 8b=0$.

Thus, the speed ratio between the sun gear $8a$ and the planet carrier $8d$ is derived:

$$\omega 8a/\omega 8d = 1 + Z8b/Z8a$$

It can be seen that the speed ratio between the sun gear 8*a* and the planet carrier 8*d* is constantly larger than 1.

The transmission 4 further comprises a dual clutch 10 disposed between the electric motor 1 and planetary gear train 8 for coupling/decoupling an output shaft 1*a* of the electric motor 1 with/from the input member of the planetary gear train 8. The dual clutch 10 may be in the form of a simplified dry dual clutch comprising a clutch housing 10*a* which is moveable in an axial direction, the clutch housing 10*a* being coupled with the output shaft 1*a* of the electric motor 1 and thus forming an input element of the dual clutch 10, opposed first and second pressure plates 10*b* and 10*c* disposed inside and carried by the clutch housing 10*a* in a manner of being axially movable together with the clutch housing 10*a*, first and second clutch plates 10*d* and 10*e* disposed inside the clutch housing 10*a* between the first and second pressure plates 10*b* and 10*c* and opposing to the first and second pressure plates 10*b* and 10*c* respectively, a first output shaft 10*f* which carries the first clutch plate 10*d* and the sun gear 8*a*, and a second output shaft 10*g* which carries the second clutch plate 10*e* and the planet carrier 8*d*.

The first output shaft 10*f* defines the central axis of the sun gear 8*a* and is connected with the sun gear 8*a*, for example, by a spline or a key. The second output shaft 10*g* extends coaxially around the first output shaft 10*f* and is connected with the planet carrier 8*d*, for example, by a spline or a key. Preferably, the first and second output shafts are coupled by coaxial spline coupling.

The clutch housing 10*a* and the first and second pressure plates 10*b* and 10*c* are able to be axially moved together, and the first and second output shafts 10*f* and 10*g* and the first and second clutch plates 10*d* and 10*e* are axially immobile. Thus, when the clutch housing 10*a* is moved in either axial direction, one of the first and second pressure plates 10*b* and 10*c* moves towards and comes into contact with the corresponding pressure plate opposing to it, and the other one of the first and second pressure plates 10*b* and 10*c* moves away from the corresponding pressure plate opposing to it. In this way, by bi-axial displacement of the clutch housing 10*a*, the output shaft 1*a* of the electric motor 1 is kinematically coupled with the sun gear 8*a* or the planet carrier 8*d* of the planetary gear train 8.

When the output shaft 1*a* of the electric motor 1 is coupled with the sun gear 8*a*, the rotation of the output shaft 1*a* of the electric motor 1 is transmitted to the output gear 9 at a first speed ratio of $(1+Z8b/Z8a)$. On the other hand, when the output shaft 1*a* of the electric motor 1 is coupled with the planet carrier 8*d*, the rotation of the output shaft 1*a* of the electric motor 1 is transmitted to the output gear 9 at a second speed ratio of 1. In this way, dual speed ratios are provided by the planetary gear train 8.

The first speed ratio of the planetary gear train 8 is decided by its structure, in particular by the numbers of teeth of the sun gear 8*a* and the annular gear 8*b*. Thus, by deliberately select the numbers of teeth or the diameters of the sun gear 8*a* and the annular gear 8*b*, a desired first speed ratio can be obtained.

The movement transmitted through the transmission 4 is reversible. Thus, during normal forward running of the vehicle, the electric motor 1 rotates normally. When the gearshift of the vehicle is put into a reverse location, the electric motor 1 will rotate reversely. As a result, the wheels 3 are driven in a reverse direction.

It is appreciated that, in the illustrated embodiment, the pressure plates are axially displaceable while the clutch plates are axially immobile; however, in an alternative embodiment, the pressure plates are axially immobile while the clutch plates are axially displaceable. It is also appreciated that the pressure plates or the clutch plates may alternatively be able to move relative to each other in other directions than the axial direction.

It is further appreciated that it is not necessary that the pair of pressure plates (or the pair of clutch plates) are able to move together. In other words, when one of the pair of pressure plates (or one of the pair of clutch plates) moves, the other one of the pair of pressure plates (or the other one of the pair of clutch plates) may remain stationary.

It is further appreciated that the pressure plates and the clutch plates may be substituted by other forms of clutching elements.

In summary, the dual clutch of the invention in its broader scope comprises first and second clutching assemblies disposed between the electric motor 1 and the sun gear 8*a* and the planet carrier 8*d* of the planetary gear train 8. The dual clutch has two clutching modes when activated, i.e., a first mode in which the first clutching assembly is engaged so that the electric motor 1 is kinematically coupled with the sun gear 8*a* via the first clutching assembly, and a second mode in which the second clutching assembly is engaged so that the electric motor 1 is kinematically coupled with the planet carrier 8*d* via the second clutching assembly.

The dual clutch 10 may be actuated by any suitable actuator. In the embodiment shown in FIG. 1, an actuator 12 for the dual clutch 10 is in the form of a linear actuator which is able to output a linear movement. The actuator 12 is connected with and controlled by the controller 2. In addition, the linear actuator is shown as a pneumatic or hydraulic cylinder having a piston rod 12*a* for moving the clutch housing 10*a* back and forth. A lever 14, which is pivotable about a pivot 15, is disposed between the actuator 12 and the clutch housing 10*a*, mainly for actuating the clutch housing 10*a* with an increased force. The lever 14 is connected with the front end of the piston rod 12*a* at a first end and connected with the clutch housing 10*a* at a second end.

It is appreciated that the lever 14 can be omitted if the actuator 12 can provide enough force for actuating the dual clutch 10.

It is also appreciated that the actuator 12 may alternatively be an electric, electromagnetic, pneumatic or hydraulic motor, a solenoid or any other actuators that can output a linear or rotary movement.

As mentioned above, the dual clutch 10 may have other elements that are to be moved to put the dual clutch 10 into either of its activated clutching modes. Thus, the actuator 12 in its broader scope is adapted to be able to move those elements. By means of the actuator 12, the dual clutch 10 is driven into one of its activated clutching modes. The dual clutch 10 can return to its inactivated state by means of the actuator 12 and/or separate return means.

During a shifting process, the controller 2 controls the electric motor 1 and the actuator 12 coordinately. When the controller receives a shifting command or determines to automatically initiate a speed ratio shifting, the controller controls the torque of the electric motor 1 to output an idle torque. Then the actuator 12 drives the dual clutch 10 to be disengaged from its current clutching mode. The controller 2 determines a new speed of the electric motor 1 and sends a command to the electric motor 1. After the electric motor 1 reaches the new speed, the actuator 12 drives the dual clutch 10 into next clutching mode.

As mentioned above, the electric motor has a desired speed range in which it operates in a high efficiency region. The operation efficiency of the electric motor decreases when the speed of the electric motor falls out of this desired speed range, in particular lower than this desired speed range.

According to the invention, when the electric vehicle runs at a low speed, for example, during an accelerating stage after the vehicle is started or the electric vehicle runs on a jam road, the controller 2 controls the actuator 12 to drive the dual clutch 10 into its first clutching mode so that the electric motor 1 is kinematically coupled with the sun gear 8a and drives the wheels 3 via the sun-planet-annulus train formed by the planetary gear train 8 at the first speed ratio of $(1+Z8b/Z8a)$. Since the first speed ratio is always larger than 1, the electric motor may operate at a high speed with a high efficiency in the low vehicle speed region.

When the vehicle runs at a high speed, the controller 2 controls the actuator 12 to drive the dual clutch 10 into its second clutching mode so that the electric motor 1 is kinematically coupled with the planet carrier 8d and drives the wheels 3 directly via the planet carrier 8d at the second speed ratio of 1. Thus, the electric motor operates also at a high speed with a high efficiency in the high vehicle speed region.

As another advantage of the invention, jerk during gear shifting can be reduced. Specifically, currently existing solutions of transmissions for electric vehicles are mainly to adapt conventional transmissions of internal combustion engine vehicles to electric vehicles, including manual transmissions, CVTs (Continuous variable transmissions), dual clutch transmissions, etc. However, manual transmissions are relative simple, but are suffered from jerk during gear shifting. CVTs and dual clutch transmissions have no obvious jerk during gear shifting but are expensive and complex. According to the invention, the torque transmitted from the electric motor to each clutching assembly of the dual clutch can be controlled so that the gear shifting of the transmission will not cause a large jerk during the gear shifting. Thus, with transmission of the invention in which a planetary gear train cooperates with a dual clutch, combining motor torque and speed control during shifting, driving comfort can be improved. At this point, it is noted that, in order to minimize jerk during gear shifting, motor torque during gear shifting must be controlled deliberately.

As yet another advantage of the invention, the cost of the transmission of the invention which has a simple structure can be lowered down. Transmissions in prior art have complicated mechanical structure and control systems, which results in high cost. With the simplified structure of the transmission, formed mainly by the planetary gear train with the dual clutch and the simple actuator, the cost of the transmission can be significantly reduced.

Further, the planetary gear train has lower weight and less inertia, and is smaller than corresponding gear pairs having the same speed ratios. Thus, the transmission of the invention is more compact than conventional transmissions with gear pairs. The electric motor and the transmission of the invention can be integrated into a single housing.

Furthermore, the symmetry properties of planetary gear train provide the transmission of the invention with better characteristics of noise and vibration suppression.

Furthermore, the driving train from the output shaft of the motor to the output shaft of the planetary gear train has a coaxial arrangement, thus it is convenient to use the transmission of the invention in front driving, rear driving, as well as four wheel driving systems.

Simulations show that, by using the transmission with two-speed configuration of the invention, the battery energy consumption can be reduced by 5-10 percent with respect to the industry-standard New European Drive Cycle, without any significant increase in overall cost or packaging volume. Further, the transmission of the invention is advantageous in extending battery life and providing the potential to substantially downsize the power train and battery pack. Suitably selected speed ratios allow the motor to be kept in efficient operating region during more driving cycles.

As mentioned above, the two-speed transmission of the invention is particularly advantageous when used in an electric vehicle. However, it is appreciated that the two-speed transmission is also applicable in other vehicles or equipments which have any type of prime movers that output rotational movements.

While certain embodiments have been described, these embodiments are presented by way of example only, and are not intended to limit the scope of the inventions. The attached claims and their equivalents are intended to cover all the modifications, substitutions and changes as would fall within the scope and spirit of the invention.

What is claimed is:

1. A two-speed transmission, comprising:
a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear;
a dual clutch disposed between the planetary gear train and a prime mover which outputs a rotational movement, the dual clutch being configured to be driven into a first clutching mode in which the dual clutch kinematically couples the sun gear with the prime mover, and a second clutching mode in which the dual clutch kinematically couples the planet carrier with the prime mover; and
an actuator configured for selectively driving the dual clutch into one of the first and second clutching modes.

2. The two-speed transmission of claim 1, wherein an output shaft of the prime mover is coaxial with an output gear connected to the planet carrier.

3. The two-speed transmission of claim 1, wherein the transmission provides a first speed ratio when the dual clutch is in the first clutching mode and a second speed ratio when the dual clutch is in the second clutching mode, the second speed ratio being equal to 1, and the first speed ratio being larger than 1.

4. The two-speed transmission of claim 1, wherein the dual clutch comprises an input element for receiving the rotational movement from the prime mover, a first output shaft around which the sun gear is mounted, a second output shaft around which the planet carrier is mounted, a first clutching assembly which, in an engaged state when the dual clutch is in the first clutching mode, couples the input element with the first output shaft, and a second clutching assembly which, in an engaged state when the dual clutch is in the second clutching mode, couples the input element with the second output shaft.

5. The two-speed transmission of claim 4, wherein the actuator is coupled with the first and second clutching assemblies for selectively driving one of the first and second clutching assemblies into the engaged state, while keeping the other one of the first and second clutching assemblies in a disengaged state.

6. The two-speed transmission of claim 4, wherein the second output shaft extends around the first output shaft, and the first and second output shafts are coupled with each other by a coaxial spline coupling.

7. The two-speed transmission of claim 1, wherein the actuator comprises an electric, electromagnetic, pneumatic or hydraulic type linear or rotary actuator.

8. An electric vehicle comprising:
a two-speed transmission of claim 1, wherein the prime mover is an electric motor, the planet carrier of the planetary gear train of the transmission being coupled with at least one wheel of the vehicle; and a controller connected with the electric motor and the actuator of the transmission for controlling the operations of the electric motor and the actuator.

9. The electric vehicle of claim 7, wherein the at least one wheel comprises a pair of wheels, and the transmission is coupled with the pair of wheels via a differential.

10. The electric vehicle of claim 7, wherein the electric motor and the transmission are integrated into a single housing.

11. A two-speed transmission, comprising:

a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear;

a dual clutch disposed between the planetary gear train and a prime mover which outputs a rotational movement, the dual clutch being configured to be driven into a first clutching mode in which the dual clutch kinematically couples the sun gear with the prime mover, and a second clutching mode in which the dual clutch kinematically couples the planet carrier with the prime mover; and an actuator configured for selectively driving the dual clutch into one of the first and second clutching modes, wherein the dual clutch comprises an input element for receiving the rotational movement from the prime mover, a first output shaft around which the sun gear is mounted, a second output shaft around which the planet carrier is mounted, a first clutching assembly which, in an engaged state when the dual clutch is in the first clutching mode, couples the input element with the first output shaft, and a second clutching assembly which, in an engaged state when the dual clutch is in the second clutching mode, couples the input element with the second output shaft, wherein the actuator is coupled with the first and second clutching assemblies for selectively driving one of the first and second clutching assemblies into the engaged state, while keeping the other one of the first and second clutching assemblies in a disengaged state, and wherein each of the first and second clutching assemblies comprises a movable clutching element which is axially displaceable, and a stationary clutching element opposing to the movable clutching element.

12. The two-speed transmission of claim 11, wherein the input element comprises a clutch housing which is configured to be displaced axially by the actuator, the movable clutching element comprising a pressure plate fixed to an interior of the clutch housing, and the stationary clutching element comprising a clutch plate;

wherein the clutch plate of the first clutch assembly is carried by the first output shaft, and the clutch plate of the second clutch assembly is carried by the second output shaft; and wherein the clutch plates of the first and second clutching assemblies are disposed between the pressure plates of the first and second clutching assemblies.

13. The two-speed transmission of claim 12, further comprising a lever connected between the actuator and the dual clutch so that the actuator drives the first and second clutching assemblies via the lever.

14. A two-speed transmission, comprising:

a planetary gear train which comprises a sun gear rotatable around a central axis, a fixed annular gear disposed coaxially around the sun gear, at least one planet gear meshing between the sun gear and the annular gear, and a planet carrier which carries the at least one planet gear and is rotatable round the central axis of the sun gear;

a dual clutch operably disposed between the planetary gear train and a prime mover which outputs a rotational movement, the dual clutch being configured to be driven into a first clutching mode in which the dual clutch kinematically couples the sun gear with the prime mover, and a second clutching mode in which the dual clutch kinematically couples the planet carrier with the prime mover; and an actuator configured for selectively driving the dual clutch into one of the first and second clutching modes.

* * * * *